June 15, 1965 W. E. FURNISS 3,189,911

OPERATIONS INDICATING AND RECORDING APPARATUS

Filed July 15, 1963 3 Sheets-Sheet 1

Fig. I

OPERATIONS INDICATING AND RECORDING APPARATUS

Filed July 15, 1963 3 Sheets-Sheet 2

OPERATIONS INDICATING AND RECORDING APPARATUS

Filed July 15, 1963 3 Sheets-Sheet 3

WITNESSES

Leon J. Jaga

James T. Young

INVENTOR
William E. Furniss
BY
Ralph W. McIntire
ATTORNEY

United States Patent Office 3,189,911
Patented June 15, 1965

3,189,911

OPERATIONS INDICATING AND RECORDING APPARATUS

William E. Furniss, Penn Hills Township, Allegheny County, Pa., assignor to Westinghouse Electric Corporation, East Pittsburgh, Pa., a corporation of Pennsylvania Filed July 15, 1963, Ser. No. 295,622
5 Claims. (Cl. 346—33)

Figure 1:
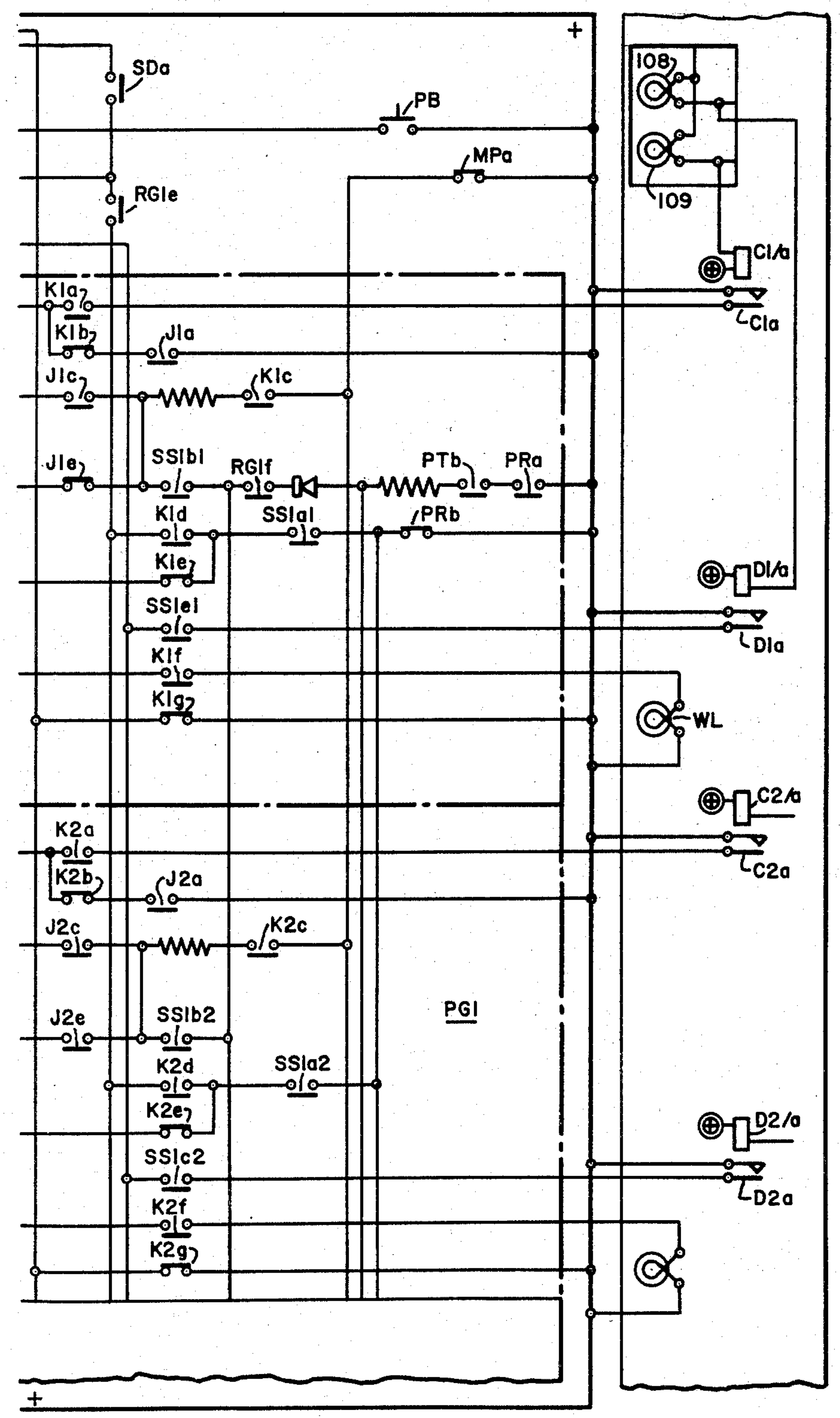

This invention relates generally to indicating and recording apparatus, and relates specifically to apparatus for indicating and recording operations in terms of the time of operation, identification of the apparatus which operated, and the type of operation.

This application is a continuation-in-part of the applicant's copending application Serial No. 54,935, filed September 9, 1960, now abandoned.

The operations recorder of the present invention has been designed to more fully utilize the advantages offered by conventional supervisory control apparatus, by providing an automatically printed record of control operations. By having operations automatically logged the operator is relieved of this routine burden and is allowed time to perform his more important dispatching duties. Another benefit of at least equal importance is the fact that during system troubles, when a number of breaker and alarm operations usually occur in a short period of time, all such operations are automatically logged by the operations recorder while the operator is busy performing the switching operations which may be necessary at such a time. Thus, a printed record is available for checking operations which occurred during system upset, and for evaluating system performance.

The operations recorder of the present invention is a system which is complete in itself and may be utilized for recording different conditions of operation of multicondition devices in response to the operation of any conventional condition responsive means.

More specifically, the operations recorder of the present invention may be provided with new supervisory control systems or may be added to existing supervisory control systems with a minimum interruption of service on the supervisory control apparatus.

It is an object of this invention to provide a monitoring means for detecting and indicating the time, location and nature of the operation of one or more devices, each device having one or more different conditions of operation.

More specifically, it is an object of this invention to provide in combination with a supervisory control system for a plurality of circuit breaker apparatus means for indicating and recording each breaker operation in terms of the time of operation, the identification of the operating breaker, the nature of the operation as being a change from trip to close or vice versa, and the derivation of the operation as being either automatic or controlled by the associated supervisory control system.

It is a further object of this invention to provide means for indicating and recording the operation of a plurality of devices having different operating conditions and including improved means for scanning a plurality of positions corresponding to said devices when one of the devices changes its operating condition.

Figure 2:
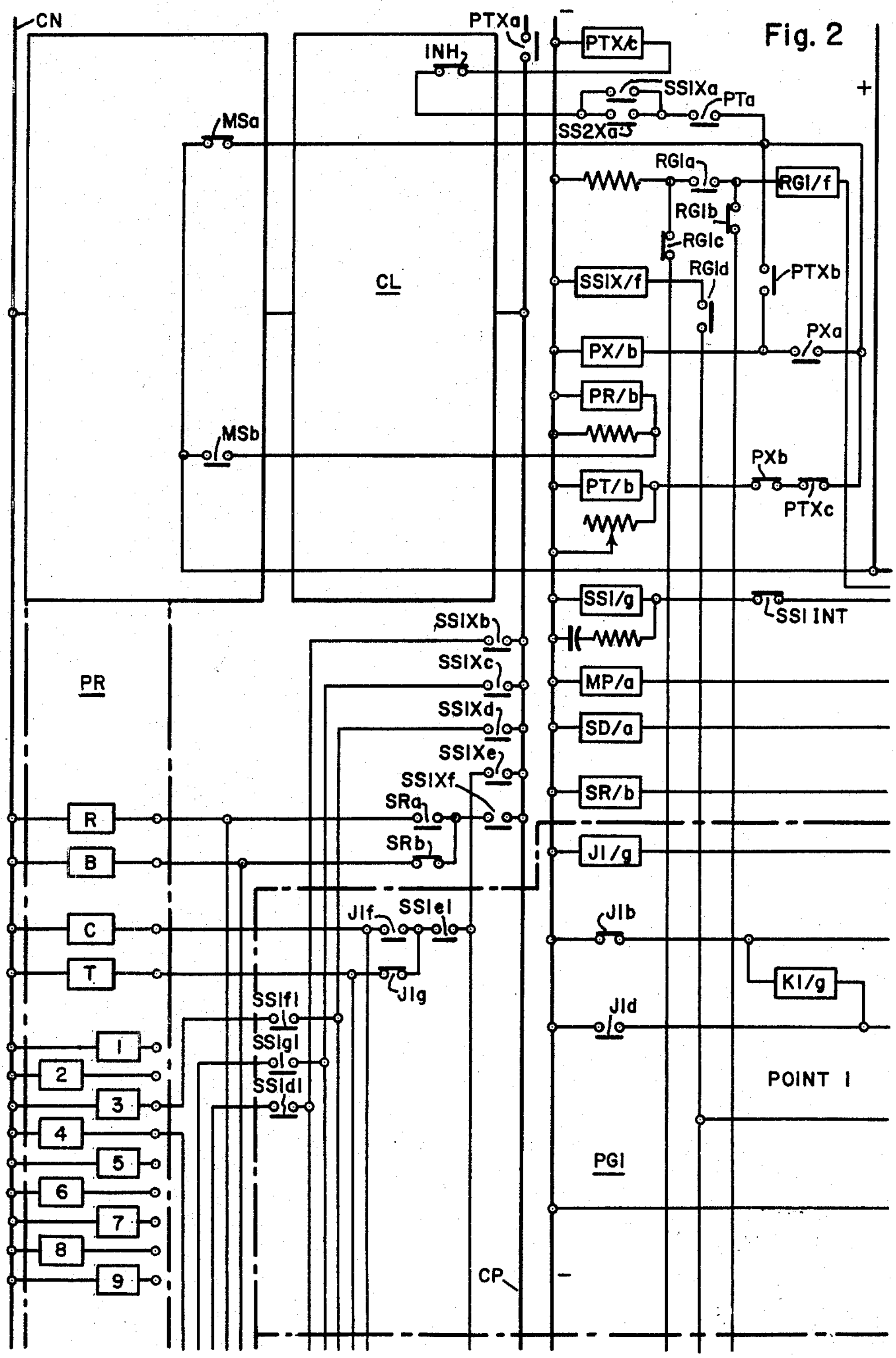
Figure 3:
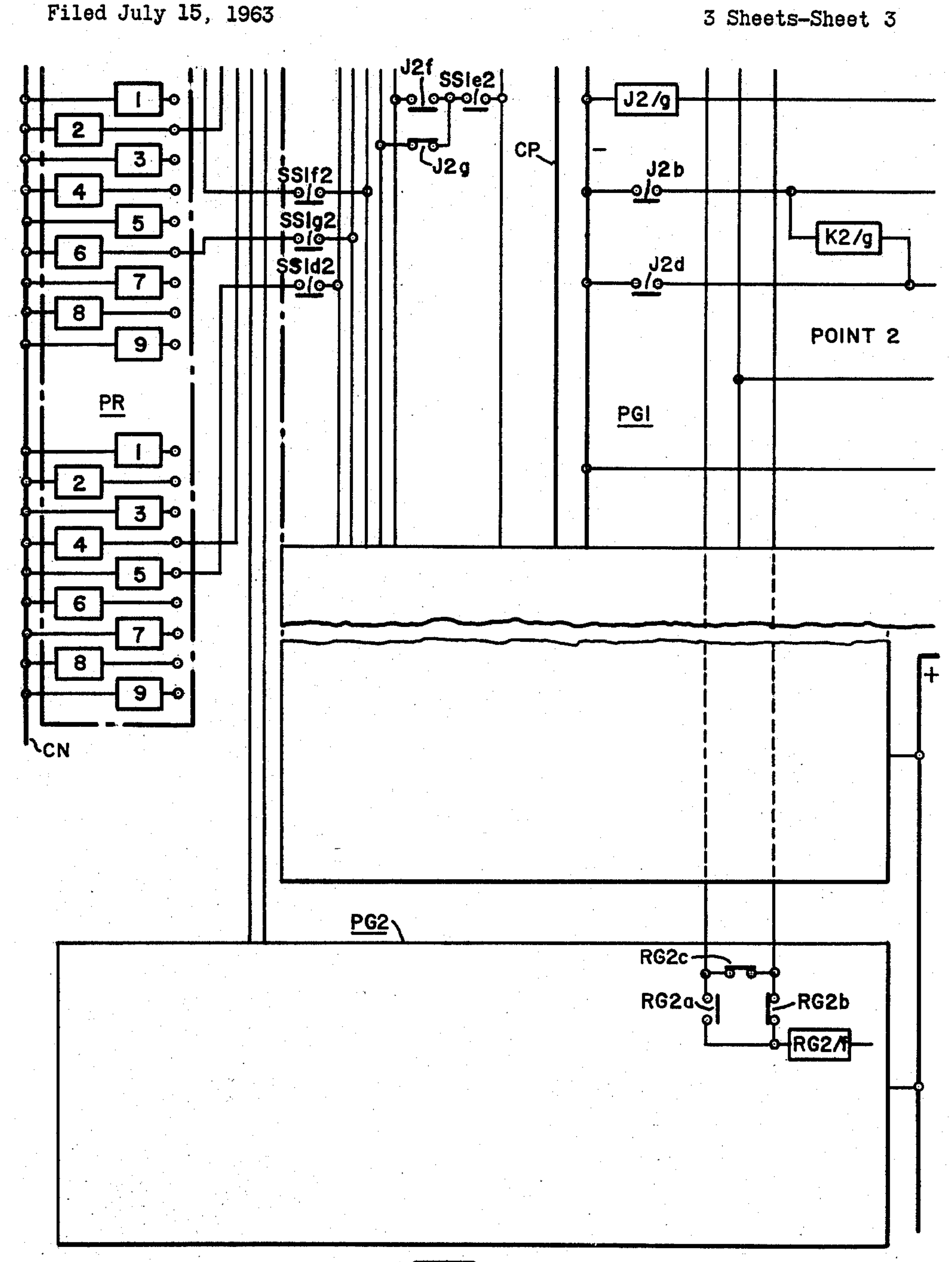
Figure 4:
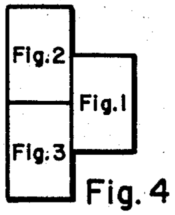

The foregoing objects as well as other objects will be made more apparent in the following description especially when considered in connection with the accompanying drawings, wherein:

FIGURES 1, 2 and 3 taken collectively comprise a schematic diagram showing the complete indicating and recording apparatus of the present invention; and FIGURE 4 shows the manner in which FIGURES 1, 2 and 3 should be combined to illustrate the invention.

Generally, the operations indicating and recording system comprises three major parts, namely, the programmer, printer, and digital clock. Also, associated with the programmer, but not included therein, are the condition responsive means corresponding to each device to be monitored and which simulate the operation of the corresponding device and provide the input to operate the programmer.

In the programmer, a point indication relay corresponding to each device to be monitored is operated to detect any change in the operating condition of the corresponding device. A condition responsive means corresponding to each point indication relay comprises initiating or information contacts being in either an open or closed condition to correspond to one condition or the other of a two position device such as a circuit breaker which may be either tripped or closed. The point indicaton relays are divided into groups, each group associated with a corresponding group relay and stepping switch. The operation of any point indication relay in response to an operation of a corresponding monitored device operates the corresponding point start relay which in turn operates the group relay which acutates the stepping switch to scan the points within the group until the point is reached where the change has taken place, thus completing a point selection operation and setting up circuits for identifying the breaker which operated, the time of operation, and the nature of the operation. A point stop indicating relay controlled by the operated point start relay and the group relay operates a data pulse power relay, common to all groups, to complete the circuits for actuating the printer in response to the programmed information. At the end of a printing cycle, the printer operates reset relay means which resets the programming system to normal.

The printer is a conventional alternating current operated parallel entry numerical data printer wherein all columns of the printer are programmed and print simultaneously. Generally, the printer is similar to an adding machine except that the data columns are solenoid-operated via the programming relays rather than by hand operated keys. A parallel entry printer is employed to provide faster printing and simplified programming. The printer may be equipped for both black or red printing upon command in order to distinguish between different types of operation as will be explained in detail hereinafter.

The digital clock is of conventional type and comprises a synchronous timer which steps five decade switches for use in programming the time of the operation by hours, minutes and tenths of minutes.

In the drawing and the specification, the reference characters have been presented in coded form in order to provide a clear indication of the relationship between each relay and its associated contact. Each relay coil is identified by one or more reference characters followed by a slant line which in turn is followed by a lower case letter. The main reference characters preceding the slant line identify the relay while the lower case letter following the slant line indicates the total number of contact pairs operated by the relay. For example, the data pulse timing relay PT is identified in the drawing by the reference characters PT/*b* indicating that the coil of the data pulse timing relay PT operates two pairs of contacts which are, namely PT*a* and PT*b*.

A different coding system is utilized to identify the stepping switches and each associated contact. Inasmuch as each stepping switch may be comprised of a plurality of stepping levels with each stepping level comprised of a plurality of fixed contact points, each stepping switch is identified by a pair of letters SS denoting stepping switch, followed by a numeral identifying the particular stepping switch, which in turn is followed by a small case letter identifying the particular stepping level of the stepping switch, which in turn is followed by a numeral indicating the contact on the identified stepping level. For example, in the reference character SS1*a*1, there is identified the first fixed contact on the first level A of stepping switch SS1. The operating coil of stepping switch SS1 is identified in the drawing by the reference characters SS1/*g*. This code identifies the stepping switch SS1 as embodying stepping levels *a* through *g*.

The programmer is adapted for operation in direct response to the operation of condition responsive means external from the operations recorder system which are available on each of the individual functions to be supervised for logging of their operations. One contact is required to record the position of each device operated. The condition responsive means in the present application comprises a condition of operation indication relay C1 connected for operation in the circuit of a lamp 109 at one point of the dispatch office of supervisory control apparatus disclosed in Patent No. 2,091,301, filed by H. P. Boswau and patented August 31, 1937, and a station indication relay D1 connected for operation in the operating circuit of lamp 108 of the same patent. As is fully explained in the Boswau patent, the circuit for lamp 109 is energized only when the corresponding breaker device at the remote station is in the closed condition. Similarly, the circuit for lamp 108 is energized only when the operation of the circuit breaker corresponding to lamp 109 and located at the remote station has automatically tripped open. Accordingly, the condition of operation indication relay C1 is energized or deenergized in direct relationship to the closed or tripped condition, respectively, of the corresponding circuit breaker, while the station indication relay D1 is energized or deenergized depending upon whether the operation of the breaker is automatic or controlled by the dispatch office, respectively.

The programming system is shown as comprising at least two groups of operation points PG1 and PG2 in conjunction with a single printer PR and a single digital clock CL. However, it is to be understood that additional groups of operation points may be added as desired. The operating point group PG1 is identical to the operating point group PG2 in that both systems include point relays for eahc point and group relays common to all points within the group. The operation point group PG1 differs from point group PG2 in that the former includes additional system relays common to both groups PG1 and PG2 for operating the printer in response to the operation of points in both groups and for resetting the operated point and group relays of both groups of the system when the printing operation is completed, as will be specifically described hereinafter.

Inasmuch as all the point programming relays in point group PG2 are identical to the point and group relays of PG1, the group PG2 is shown in block from only, it being understood that the description of the point and group relays of group PG1 pertain to group PG2 as well.

In the program group PG1, each point of operation is equipped with a point indication relay J1, J2, respectively, and an associated point start relay K1, K2, respectively. Each point indication relay J1, J2 changes position to assume the position of the corresponding initiating contacts C1*a*, C2*a*, respectively, each of which simulates indirectly the breaker operation, that is, the corresponding point indication relay and point start relay are both energized when the corresponding breaker or switch is closed. The point start relays K1, K2 are normally energized and are changed to the deenergized condition in response to any change of position of the corresponding point indication relays J1, J2. When any point start relay of the group deenergizes, the group relay RG1 is operated to start the corresponding stepping switch SS1 to scan all the point start relays K1, K2, in the groups until it reaches the point where the point start relay is deenergized, thus completing a circuit to operate a group point stop relay SS1X which, when operated, initiates operation of the system relays to connect the programming relays to operate the printer in accordance with the position of the corresponding point indication relay J1, J2 and the position of the stepping switch SS1. When the point stop relay SS1X is operated, a circuit is completed to operate a data pulse power relay PTX, which connects power to the data solenoid circuits of the printer PR. A normally energized data pulse timing relay PT, having a delayed drop-out time, is deenergized at the beginning of the print data pulse by operation of power relay PTX and serves to limit the data pulse to a predetermined time, such as 50 milliseconds. The combined operation of power relay PTX and point stop relay SS1X as above described, completes a number of programming circuits to the printer, namely, a circuit to one or the other of two printing operating circuits in combination with the operated one of the point indication relays J1, J2 to actuate the printer to indicate whether the operation is a trip or a close, and also completes circuits in combination with the stepping switch SS1 to print out the identification number of the operated breaker or switch, and, further, connects the digital clock to operate the time print solenoids of the printer.

After the printer has completed a printing cycle, a printer operated feedback contact MS closes during the printing cycle to operate the printer reset relay PR which, in cooperation with the stepping switch SS1, provides for reset of the deenergized "K" relay to the normally energized position. When printing is completely for the selected point, the feedback control contact MS reopens and deenergizes the printing reset relay PR. The recorder and programming system are at rest assuming there is no other operation at any point in the group which should be recorded. The stepping relay remains at rest at the last recorded position.

Only two points 1 and 2 are shown in the point group PG1 to thus clearly illustrate the principles of the present invention. However, one practical application of the present invention provides for 25 points in each group, wih each group adapted to be scanned by a single stepping switch corresponding thereto.

*Operation of the recorder system*

When the operations recorder system is at rest, all point start relays K1, K2, in all groups are energized, the system data pulse timing relay PT is energized, the stepping relay of each group PG1, PG2, such as stepping relay SS1 of PG1, are stopped on the last recorded point, and each point indication relay, such as J1, is either energized or deenergized depending upon whether the corresponding initiating contacts, such as contacts C1*a*, are closed or opened respectively.

A typical operation of the point and group relays of the programmer system will be described in terms of point 1, where it is assumed that the breaker at point 1 of the remote station of the supervisory control apparatus is open, in which event condition responsive relay C1 is deenergized and contacts C1*a* are open. At the same time, point start relay K1 is energized from positive through contacts MP*a* K1*c*, J1*e*, the coil of relay K1, and contacts J1*b* to negative. The open initiating contact C1*a* prevents completion of the energizing circuit for point indication relay J1. If it is now assumed that the breaker at point 1 of the remote station should be reclosed either automatically or by operation of the supervisory control equipment, condition responsive relay C1 is energized to close its contact C1*a*, thus completing the energizing circuit for point indication relay J1 from positive through contacts C1*a*, closed contacts K1*a* of normally energized point start relay K1 to negative, thereupon effecting deenergization of point start relay K1 through the operation of contacts J1*e* and J1*b* in the previously described energizing circuit for point start relay K1. Upon deenergization of point start relay K1, contacts K1*b* are closed in series with closed contacts J1*a* in shunt with contacts K1*a* of the previously described energizing circuit for point indication relay J1 to provide a lock-in circuit for relay J1 and, thereafter, contacts K1*a* are opened in the previously described energizing circuit for point indication relay J1 to prevent further operation of relay J1 by the initiating contacts C1*a* in the event of another change in the breaker at point 1 before the printer has operated. Also, in response to the previously described deenergization of point start relay K1, contacts K1*c* are opened in the previously described energizing circuit for the point start relay K1 to prevent energization of relay K1 by the closing of contact J1*c* and J1*d* of point indication relay J1 which set up a different normally energizing circuit for relay J1 for operation through the common contact K1*c* when the point start relay K1 is reenergized at reset of the operations recorder as will be hereinafter described in detail.

The group indication relay RG1 is energized through the closing of contacts K1*g* as a result of the previously operated point start relay K1 which completes a circuit from positive through contacts K1*g*, the coil of group relay RG1, contacts RG1*b*, contacts RG2*b* of group indication relay RG2 in the second group PG2, contact RG2*c*, contacts RG1*c* to negative.

It is to be noted that the operation of any "K" relay within the group of PG1 will energize group relay RG1. The energization of group relay RG1 closes contacts RG1*a*, to provide a hold-in circuit bypassing the contacts RG2*c* of group relay RG2, and at the same time opens contacts RG1*b* and RG1*c* to prevent group relay RG2 from being energized so long as RG1 is in the energized condition. This mutual interlocking between group relays RG1, RG2 of the different groups prevents the selection of any other group for recording until the printing operations of all operated points in the first selected group has recorded all operated points and resets to normal. In this respect, it is to be noted that if group relay RG2 should be operated before group relay RG1, contacts RG2*c* and RG2*a* operate to prevent operation of the group relay RG1.

In order to provide a scanning operation of all the points in group PG1, operation of the stepping switch SS1 in cooperation with the step delay relay SD is set up by the previously described operation of group relay RG1, which closes contacts RG1*e* to complete a circuit to slow to drop-out step delay relay SD from positive through contacts PR*b* of reset relay PR, through contacts of whichever point the stepping switch SS1 is stopped upon, which in this instance is assumed to be contacts SS1*a*2, contacts K2*d* of energized point start relay K2, contacts RG1*e*, the coil of step delay relay SD to negative. After a time delay, step delay relay S*d* operates to close contacts SD*a* completing a circuit through the previously described energizing circuit for step delay relay SD to operate stepping switch SS1, whereupon step switch SS1 is energized to interrupt its own energizing circuit at its interrupting contacts SS1INT. As the stepping switch deenergizes, it steps to the next point J3 (not shown) whereupon the energizing circuit of step delay relay SD is opened as stepping switch SS1 leaves point SS1*a*2 and is deenergized where the stepping switch steps to the next point SS1*a*3 (not shown). As the stepping switch arrives at point SS1*a*3 a new circuit is completed for energizing step delay relay SD whereupon after a time delay stepping switch SS1 energizes and steps to the next point. The stepping switch SS1 continues to step from point to point in cooperation with the time delay operation of step delay relay SD until the stepping switch SS1 reaches point 1 and thereupon closes contact SS1*a*1. However, because of the deenergized condition of the point start relay K1 at point 1, as above described, contacts K1*d* are opened to prevent completion of an energizing circuit for step delay relay SD, thus preventing further stepping of the stepping relay SS1 from point 1.

The deenergized condition of point start relay K1 closes its contacts K1*e* to set up an energizing circuit for point stop relay SS1X, which is energized when stepping relay SS1 reaches point 1 and closes its contacts SS1*a*1 to complete a circuit for energizing SS1X from positive through contact PR*b*, SS1*a*1, K1*e*, RG1*d*, the coil of point stop relay SS1X, to negative. It is to be noted that point stop relay SS1X is common to all points of the group PG1 so that when the stepping switch SS1 steps to any point where the corresponding "K" relay is deenergized, a circuit is completed to energize point stop relay SS1X.

The data pulse power relay PTX for applying power to the printer in cooperation with the point stop relay SS1X, is operated by the operation of point stop relay SS1X through a circuit from positive through normally closed printer operated contacts MS*a*, closed contacts PT*a* of normally energized data pulse timing relay PT, contacts SS1X*a* of step relay SS1, normally closed inhibit contacts INH of the digital clock CL, the coil of relay PTX, to negative.

In order that the data pulse power relay PTX may be energized for only a predetermined limited time, and in order that the data pulse power relay PTX may be prevented from further energization until after a printing cycle is completed, there is provided an auxiliary print relay PX which is energized in response to operation of power relay PTX through a circuit extending from positive, through contacts MS*a*, contacts PTX*b*, the coil of relay PX, to negative. The auxiliary print relay PX locks in through its own contacts PX*a* and contacts MS*a*, and at the same time operates to deenergize data pulse timing relay PT through the opening of contacts PX*b* in the energizing circuit of relay PT from positive, through contacts MS*a*, contacts PT*xc*, contacts PX*b*, the coil of relay PT, to negative. The normally energized pulse timing relay PT drops out after a time delay of about 50 milliseconds to deenergize the previously described energizing circuit for data pulse timing relay PTX at contacts PT*a*.

The previously described operation of the point stop relay SS1X and the data pulse timing relay PT operate the printer to provide the data relative to the operation of the point 1 breaker as programmed by the operation of the J1 relay and the final position of the stepping switch SS1. Specifically, the breaker close print solenoid C is energized from positive through contacts PTX*a*, contacts SS1X*e*, contacts J1*f*, and the coil of C relay to neutral. It is seen that if the J relay were deenergized, the breaker print trip solenoid T would be energized instead.

The identification of the operated breaker at point 1 which is assumed to be number 324, is provided through the energization of the hundreds solenoid 3, tens solenoid 2 and units solenoid 4. The number 3 solenoid in the hundreds print solenoids of the printer is energized from positive through contacts PTX*a*, SS1X*d*, and SS1F1 to neutral. At the same time the number 2 solenoid of the tens print solenoids of the printer is energized from positive through contacts PTX*a*, SS1X*c*, SS1*g*1, through the number 2 solenoid to neutral. At the same time the number 4 solenoid of the units print solenoids of the printer is energized from positive through contacts PTX*a*, SS1X*b*, SS1*d*1, the coil of the number 4 relay to neutral.

The digital clock is operated at the time of print-out to energize appropriate ones of the time print solenoids (not shown) in the printer, in terms of tens hours, units hours, tens minutes, units minutes and tenths minutes. This is achieved through a circuit from positive through contacts PTX*a*, through the digital clock CL to the time print relays to neutral.

When the data pulse power relay PTX is deenergized by operation of the data pulse timer relay PT after a print pulse of predetermined length, in the manner described above, all the previously described programming circuits are opened to terminate the programming input pulse to the printer, whereupon the printer automatically starts the printing cycle to print-out the information applied by the programming relays in the manner above described. At the termination of a printing cycle, the printer automatically opens contacts MS*a* to release the lock-in circuit for the auxiliary print relay PX. At the same time the printer closes contacts MS*b* to provide an energizing circuit for the print reset relay PR. The operation of print reset relay PR opens contacts PR*b* to open the previously described energizing circuit for point stop relay SS1X, whereupon SS1X drops out.

At the end of the printing cycle the printer automatically closes contacts MS*a* for reenergizing data pulse timing relay PT and opens contacts MS*b* to open the energizing circuit for the printer reset relay PR, which drops out after a time delay.

Inasmuch as reset relay PR is of the time delay type, a circuit is maintained momentarily for picking up the deenergized point start relay K1 from positive through contacts PR*a*, PT*b*, RG1*f*, SS1*b*1, J1*c*, the coil of K1, and contacts J1*d*.

The reenergization of point start relay K1 establishes the previously described normal at rest condition by closing of contacts K1*a* to re-establish control of the point indication relay J1 by the initiating contacts C1*a*, by reopening contacts K1*g* to deenergize group relay RG1, by reclosing contacts K1*d* to establish control of the stepping relay SS1 through point 1, and by reopening contacts K1*e* to prevent energization of point stop relay SS1X on point 1. The system is now at rest with the stepping switch remaining at the last recorded point, which in this instance is point 1.

In the event that the breaker at point 1 should reopen immediately upon being reclosed, the supervisory control apparatus would effect deenergization of relay C which operates to open initiating contacts C1*a*, which would effect an immediate deenergization of the point indication relay J1. However, the J1 relay is locked in through the previously described operation of the point start relay K1 and the corresponding closing contacts K1*b* so that the immediate reopening of contacts C1*a* has no effect upon the point indication relay J1 until the point start relay K1 is reset to normal in the manner described above, after a printing operation. When start relay K1 is reset, the lock-in circuit for point indication relay J1 is interrupted at K1*b* and the energizing circuit for point indication relay J1 is set up at the closing of contacts K1*a*, but is not completed because of the now open contacts C1*a*, thus effecting drop-out of the point indication relay J1. Immediately, the K1 relay is again deenergized through the opening of contacts J1*e* and J1*b* in the energizing circuit of point start relay K1 to thus initiate another printing cycle at point 1 in the manner described above.

It is to be noted that because the reset relay PR does not drop-out until after the operated "K" relay is reset, the stepping switch SS1 will be prevented from moving away from point 1 to the next point in the group PG1 until all the operations at point 1 are completed. Specifically, the stepping switch circuit depends for operation upon the complete drop-out of the reset relay PR and the closing of its contacts PR*b*.

It is also to be noted that the operated group relay does not drop-out until all the deenergized "K" relays in its group have been reenergized, thus preventing operation of any other group relay RG2 through the previously described interlock circuit until all the operated points in the operated group are properly reenergized. For example, in this respect it is to be noted that the contacts K1*g* of point K1 and contacts K2*g* of point K2 are parallel connected in the energizing circuit for group relay RG1.

If desired, the operations recorder system may include a source of operation indicator and recorder, such as station indication relay SR which may be responsive to contacts D1*a* of station indication relay D1, which is added in parallel with the previously described lamp 108 at the dispatch office of the supervisory control apparatus. The lamp 108 is energized only when operation of the breaker at the remote station is automatic, in contrast to a strip operation as initiated by the dispatch office, in which latter event the contacts D1*a* would remain open.

When applied to devices other than supervisory apparatus, the source of operation relay SR may be utilized to record the method of operation, such as manual or automatic.

It is seen that when the stepping switch SS1 is stopped on point 1 in the above described operation of the operations recorded, an operating circuit is set up for station indicating relay SR from positive through contacts D1*a*, contacts SS1*c*1, the coil of station indication relay SR to negative, so that if contacts D1*a* are closed, relay SR is energized. Accordingly, when the data pulse relay PTX and point stop relay SS1X operate, as previously described, a circuit is set up for operating the red print relay R or the black print relay B in the printer from positive through contacts PTX*a*, SS1XF, either contacts SR*a* or SR*b*, through the red print relay R or black print relay B, respectively, to negative.

Since the "D" relay is reset by operation of the reset button on the supervisory control dispatch office apparatus, as explained in the Boswau patent, a white lamp WL is provided adjacent to the supervisory control reset button to indicate that the recorder is printing. This lamp is connected for operation across the station battery by means of contacts which are closed when the "K" relays drop out, as for example, contact K1*f* at point 1. When the lamp is lighted, the reset button should not be operated. The recorder will print approximately 2 to 2½ operations or points in a second, therefore, the lamp will not be on for more than a few seconds except in extreme cases of operation or power loss of the recording equipment.

When the operations recorder system and the supervisory control system are energized initially or after a power failure, all "K," "J," "C" and "D" relays will be in the deenergized condition. Therefore, when power is first applied, the recorder will proceed to print each point as being in the tripped or in the "T" position in black, starting with whichever point the stepping relay SS1 is resting upon at the time of reenergization, whereupon the stepping switch proceeds to scan each point in sequence until all the "K" relays are reenergized in the manner described above.

If the supervisory control apparatus remains in operation and the operations recorder system power alone is interrupted, it is seen from the foregoing description that the printer would first print the "T" position for the first breaker operation point upon which the stepping switch is resting. If the first breaker were actually closed, the recorder would next print the "C" position of the same breaker before stepping to the next point. The second printing would indicate red or black, as required, since the white lamp discussed above would have signalled to the operator not to reset the supervisory control apparatus, thereby maintaining the "D" relay operated.

The time of recording, after restoring of a power loss to the clock and recorder, will not be coordinated with the actual time of operation. The clock must be adjusted manually. The readings after restoration of power will print with time of the power loss or time of the power restoration depending upon whether the clock was corrected before or after power restoration.

It is important to point out that the operations indicating and recording apparatus of the invention as disclosed may be employed as a local recording and indicating apparatus in combination directly with a plurality of devices or apparatus which have two or more operating conditions to record the different operating conditions of such devices in response to the operation of condition responsive means associated therewith. In other words, the operations indicating and recording apparatus as disclosed may be employed either at a location which is remote from that of the devices or apparatus being monitored when utilized with remote control or supervisory equipment or at the same location as the devices or apparatus being monitored when the indicating and recording apparatus is applied independently of a remote control or supervisory system as a local operation indicating and recording apparatus.

Although there has been shown and described a specific structure, it is to be clearly understood that the same is merely for the purpose of illustration and that changes and modifications may readily be made therein by those skilled in the art without departing from the spirit and scope of the invention.

What I claim as my invention:

1. Operations recorder apparatus for use with supervisory control apparatus for remotely and selectively operating different ones of a plurality of multi-condition devices, said recorder apparatus comprising: a plurality of detecting means each individual to a different one of said plurality of multi-condition devices and cooperating with the supervisory control apparatus to detect a change in the operating condition of the associated device from any one condition to another; scanning means responsive to the operation of any one of said detecting means and operable to scan a plurality of positions, each position corresponding to a different one of said detecting means; means responsive to the operated one of said detecting means for stopping the scanning means on the position corresponding to the operated detecting means; means responsive to the operated one of said detecting means and the position of the stopped scanning means operable to provide a recorded identification of the operated device and the nature of the operation; interlocking means preventing operation of said detecting means during a recording operation; reset means responsive to completion of a recording operation for releasing said interlocking means, and said scanning means remaining at its last stopped position after operation of the reset means until the detecting means is again operated.

2. Operations recorder apparatus for use with supervisory control apparatus for remotely and selectively operating different ones of a plurality of multi-condition devices, said recorder apparatus comprising: a plurality of detecting means each individual to a different one of said plurality of multi-condition devices and cooperating with the supervisory control apparatus to detect a change in the operating condition of the associated device from any one condition to another; scanning means responsive to the operation of any one of said detecting means and operable to scan a plurality of positions, each position corresponding to a different one of said detecting means; means responsive to the operated one of said detecting means for stopping the scanning means on the position corresponding to the operated detecting means; and means responsive to the operated one of said detecting means and the position of the stopped scanning means operable to provide a recorded identification of the operated device, the nature of the operation, and the time of the operation; interlocking means preventing operation of said detecting means during a recording operation; reset means responsive to completion of a recording operation for releasing said interlocking means, and said scanning means remaining at its last stopped position after operation of the reset means until the detecting means is again operated.

3. An operations recorder for use with supervisory control apparatus for remotely and selectively operating different ones of a plurality of multi-condition devices, said recorder comprising: a plurality of condition indicating means each individual to a different one of said plurality of multi-condition devices and operable to response to operation of the corresponding device to indicate each condition of the corresponding device; detecting means individual to each indicating means for operating from a first condition to a second condition in response to any operation of the corresponding indication means; means operable to scan said detecting means; means responsive to the operation of any one of said detecting means to said second condition to start said scanning means; means individual to each detecting means and operable in response to the operation of the detecting means to said second condition to stop the scanning means at the corresponding detecting means; printing means operable to selectively record the identification of each of the devices and the nature of the operation; circuit means responsive to operation of the detecting means to said second condition and the stopped position of the scanning means to operate the printing means to record the identification of the device corresponding to the operated detecting means; circuit means responsive to the operation of the condition indicating means and the operation of corresponding detecting means to the second condition to effect operation of the printer to print the nature of the operation corresponding to the condition of the condition indicating means; means responsive to the completion of a printing operation to effect reset operation of said operated detecting means from said second condition to said first condition, and said scanning means remaining at said stopped position until said detecting means is again changed from said first condition to said second condition.

4. An operations recorder for recording the operations of a plurality of multi-condition devices, said recorder comprising: a plurality of condition indicating means each individual to a different one of said plurality of multi-condition devices and operable in response to operation of the corresponding device to indicate each condition of the corresponding device; detecting means individual to each indicating means for operating from a first condition to a second condition in response to any operation of the corresponding indicating means; means individual to each detecting means and responsive to the operation of the corresponding detecting means to said second condition to prevent further operation of the condition indicating means until the detecting means is reset from said second condition to said first condition; means operable to scan said detecting means; means responsive to the operation of any said detecting means to said second condition to start said scanning means; means individual to each detecting means and operable responsive to the operation of the detecting means to said second condition to stop the scanning means at the corresponding detecting means; printing means operable to selectively record the identification of each of the operated devices and the nature of the operation; circuit means responsive to operation of the detecting means to said second condition and the stopped position of the scanning means to operate the printing means to record the identification of the device corresponding to the operated detecting means; circuit means responsive to the operation of the condition indicating means and the operation of the corresponding detecting means to the second condition to effect operation of the printer to print the nature of the operation corresponding to the condition of the condition indicating means; means responsive to the completion of a printing operation to effect reset operation of said operated detecting means from said second condition to said first condition; means responsive to the operation of said resetting means to prevent operation of the scanning means until after reset of the detecting means from said second condition to said first condition, and said scanning means remaining at said stopped position until said detecting means is again changed from said first condition to said second condition.

5. In combination; supervisory control apparatus for remotely and selectively operating a plurality of devices from any one of a plurality of operating conditions to another, said apparatus including a plurality of indicating means each individual to one device and operable to indicate the condition of operation of the corresponding device; a plurality of detecting means each cooperating with a different one of said indicating means and operable to detect any change in the operating condition of the associated indicating means; scanning means responsive to the operation of any one of said detecting means and operable to scan the detecting means; means individual to each detecting means responsive to the operated detecting means for stopping the scanning means on the corresponding detecting means; recording means operable to selectively print the identification of each device and condition of operation; circuit means responsive to the operation of any one of said detecting means to effect operation of the printer to record the nature of the operation as determined by the detecting means and the identification of the device which operated as determined by the stopped position of the scanning means; interlocking means preventing operation of said detecting means during a recording operation; reset means responsive to completion of a recording operation for releasing said interlocking means, and said scanning means remaining at its last stopped position after operation of the reset means until the detecting means is again operated.

References Cited by the Examiner

UNITED STATES PATENTS

| | | | |
|---|---|---|---|
| 2,607,843 | 8/52 | Hearn et al. | 340—163 |
| 2,944,247 | 7/60 | Breese | 340—163 |
| 2,962,702 | 11/60 | Derr et al. | 340—150 |
| 2,993,194 | 7/61 | Derr et al. | 340—163 |
| 3,082,403 | 3/63 | Silliman et al. | 340—163 |

LEYLAND M. MARTIN, *Primary Examiner.*

LEO SMILOW, *Examiner.*